(12) United States Patent
Yamauchi et al.

(10) Patent No.: US 7,800,314 B2
(45) Date of Patent: Sep. 21, 2010

(54) PROJECTOR AND DRIVING METHOD OF LIGHT SOURCE FOR PROJECTOR

(75) Inventors: Kentaro Yamauchi, Matsumoto (JP); Shigeyasu Soma, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 230 days.

(21) Appl. No.: 12/128,910

(22) Filed: May 29, 2008

(65) Prior Publication Data

US 2008/0297739 A1 Dec. 4, 2008

(30) Foreign Application Priority Data

Jun. 4, 2007 (JP) ............................. 2007-147745

(51) Int. Cl.
*H05B 41/16* (2006.01)
*G03B 21/14* (2006.01)

(52) U.S. Cl. ................... 315/287; 315/246; 315/209 R; 315/291; 315/357; 353/85

(58) Field of Classification Search ................. 315/287, 315/246, 209 R, 337, 339, 340, 357, 46, 63, 315/291, 297, 307–311; 353/85
See application file for complete search history.

(56) References Cited

U.S. PATENT DOCUMENTS

2006/0066261 A1 3/2006 Rahmane et al.

2010/0157257 A1* 6/2010 Nishizawa et al. ............ 353/85

FOREIGN PATENT DOCUMENTS

| EP | 1 624 733 A | 2/2006 |
|---|---|---|
| JP | A 2002-175890 | 6/2002 |
| JP | A 2003-264094 | 9/2003 |
| JP | A 2004-39563 | 2/2004 |
| JP | A-2006-025597 | 1/2006 |
| JP | A 2006-59790 | 3/2006 |
| JP | A-2006-173022 | 6/2006 |
| JP | A 2006-332015 | 12/2006 |
| WO | WO 2004/066687 A1 | 8/2004 |
| WO | WO 2005/006819 A | 1/2005 |
| WO | WO 2008/053428 A | 5/2008 |

* cited by examiner

*Primary Examiner*—Tuyet Thi Vo
(74) *Attorney, Agent, or Firm*—Oliff & Berridge, PLC (57) ABSTRACT

A projector includes an discharge lamp which has a first electrode and a second electrode and emits light by generating discharge between the first and second electrodes, and a driving system which supplies power by alternating polarities of the first electrode and the second electrode. The driving system is operable in a restoration mode. The driving system melts surface layers of a tip and a surrounding area of the tip extending from a main body of one of the first and second electrodes, and expands a new tip on a tip area of the main body of the one electrode in the restoration mode.

17 Claims, 8 Drawing Sheets

PROJECTOR AND DRIVING METHOD OF LIGHT SOURCE FOR PROJECTOR

This application claims priority from Japanese Patent Application No. 2007-147745 filed in the Japanese Patent Office on Jun. 4, 2007, the entire disclosure of which is hereby incorporated by reference in its entirety.

BACKGROUND

1. Technical Field

The present invention relates to a projector which includes a discharge light emission type light source having a pair of electrodes and a driving method of a light source for a projector.

2. Related Art

According to a discharge lamp lighting device for a projector which uses a high pressure discharge lamp, it is known that a projection is formed on the tip surface of each electrode of the lighting device during light emission. However, in such a condition where the lighting device continuously emits light for a long period, a plurality of such projections may be formed or the tip surface of the electrode may be even concaved or convexed. These phenomena lead to instability of the discharge position, causing decrease in illuminance or flickering due to arc shift. For overcoming these drawbacks, a technology currently proposed melts the electrode surface to smooth the tip surface of the electrode (see JP-A-2002-175890). Another related-art technology melts unnecessary projections other than an essential projection as a starting point of discharge to remove the projections (see JP-A-2006-332015 and JP-A-2006-59790).

According to the technology disclosed in JP-A-2002-175890, however, the projections as the starting points of discharge disappear on both sides of the electrodes at the same time. Thus, the distance between the tips of the electrodes increases. In this case, the arc length considerably increases, and light utilization efficiency lowers in optical systems disposed downstream from the electrodes. Moreover, because the starting point of discharge is not determined, flicker and arc shift are easily caused. These conditions lead to flickering—of a projection image or lowering of light utilization efficiency in the optical systems disposed downstream.

The technologies shown in JP-A-2006-332015 and JP-A-2006-59790 do not prevent deformation and shift of the projection which is essential as the starting point of discharge, and thus cannot improve flickering of a projection image and lowering of light utilization efficiency caused by variations in the arc length and arc position resulting from the deformation and shift of the projection.

SUMMARY

It is an advantage of some aspects of the invention to provide a projector which includes a discharge light emission type light source capable of stabilizing the electrode shape and providing constant target light emission condition by restoring the tips of a pair of electrodes of the light source one by one.

It is another advantage of some aspects of the invention to provide a driving method of the light source included in this projector.

A projector according to a first aspect of the invention includes: (a) a discharge lamp which has a first electrode and a second electrode and emits light by generating discharge between the first and second electrodes, and a driving system which supplies power by alternating polarities applied to the first electrode and the second; and (b) the driving system is operable in a restoration mode, and the driving system melts surface layers of a tip and a surrounding area of the tip extending from a main body of one of the first and second electrodes, and expands a new tip on a tip area of the main body of the one electrode in the restoration mode. The surface layer herein contains a surface layer of the electrode main body, and refers to an outer peripheral area having a certain thickness or larger.

According to this projector, the driving system melts the surface layers of the projection-shaped tip and the surrounding area of the tip extending from the main body of the electrode more greatly damaged in the pair of the first and second electrodes, for example, and expands a new tip of the main body of the one electrode in the restoration mode. Thus, the positions and shapes of the projections formed on the tips of the electrodes are stabilized, and flickering and color unevenness are prevented. Accordingly, high illuminance and enhanced illumination utilization efficiency of the projector can be maintained for a long period.

It is preferable that the driving system expands a tip on a tip area of a main body of the other electrode when melting surface layers of the tip and the surrounding area of the tip of the one electrode in the restoration mode. In this case, the surface layers of the tip and the surrounding area of the tip of the one electrode are melted, and simultaneously the tip of the other electrode is expanded. Thus, smoothing of the tip area surface of the electrode main body and expansion of the tip on each of the electrodes can be efficiently achieved.

It is preferable that the driving system melts the surface layers of the tip and the surrounding area of the tip extending from the main body of the one electrode by increasing the anode period of the one electrode longer than the anode period of the other electrode, and expands the tip on the tip area of the main body of the one electrode by decreasing the anode period of the one electrode shorter than the anode period of the other electrode in the restoration mode. In this case, smoothing of the surface layer of the electrode main body and expansion of the tip can be efficiently achieved by controlling the anode period of each electrode. The anode period herein refers to a period during which the related electrode is the anode in one alternating cycle.

It is preferable that the driving system changes duty ratio of alternating current waveform for the first and second electrodes from duty ratio of alternating current waveform in a normal mode when melting the surface layers of the tip and the surrounding area of the tip of the one electrode in the restoration mode, satisfying a conditional expression of $0.5 < a < 1$ assuming that the anode period proportion of the one electrode is a and that the anode period proportion of the other electrode is $1-a$. In this case, melting of the surface layers of the tip of the electrode and the surrounding area of the tip and expansion of the tip of the main body of the electrode can be achieved to an necessary extent by the easy operation of changing the duty ratio of alternating current waveform. More specifically, the temperature of the main body of the one electrode can be increased by setting the anode period proportion of the one electrode at the value a satisfying the above conditional expression, and the tip and the surrounding of the tip of the electrode can be thus melted. Moreover, the tip having large heat capacity and wide contact area with the electrode main body can be expanded on the main body of the other electrode by setting the anode period proportion of the other electrode at the resultant value of $1-a$.

It is preferable that a conditional expression $0 < b < 0.5$ is satisfied when the tip of the main body of the one electrode is expanded assuming that the anode period proportion of the one electrode is b and that the anode period proportion of the other electrode is 1−b in the restoration mode. In this case, the tip having large heat capacity and wide contact area with the electrode main body can be expanded on the main body of the one electrode by setting the anode period ratio of the one electrode at the value b satisfying the above conditional expression.

It is preferable that duty ratio of alternating current waveform for the one electrode and the other electrode is substantially constant in the normal mode, and that a conditional expression b<c<a is satisfied assuming that the anode period proportion of the one electrode is c and that the anode period proportion of the other electrode is 1−c in the normal mode.

It is preferable that the driving system regularly operates in the restoration mode at predetermined time intervals. In this case, the position and shape of the tip of the electrode can be stabilized for a long period by regularly performing operation in the restoration mode.

It is preferable that the driving system suspends operation in the restoration mode until the operation of the discharge lamp enters the normal mode after startup. In this case, predetermined power can be supplied to the respective electrodes in a stable manner by changing to the restoration mode while the discharge lamp is operating in the normal mode. Thus, the electrodes can be securely restored.

It is preferable to further includes a detection unit which detects electrode abnormal condition where at least either the operation of the first electrode or the second electrode is abnormal, and the driving system starts operation in the restoration mode according to detection result of the detection unit. In this case, the electrode abnormal condition can be restored at the time of occurrence without leaving the condition as it is by melting and smoothing the surface layers of the tip and the surrounding area of the tip of the electrode having been the cathode at the time of the electrode abnormal condition. Thus, flickering of illumination light can be decreased. The electrode abnormal condition herein refers to a condition where flicker or arc jump is caused due to instability of arc.

It is preferable that the driving system employs alternating current waveform having a peak at least in the longer period of the two polarity periods in one cycle lies immediately before polarity switch. In this case, prevention of flicker caused by extremely lowered temperature of the electrode having the long cathode period, and reduction of flickering of illumination light can be achieved.

It is preferable that, in case that the driving system suspends either the melting step or the expansion step for the tip, the driving system carries out the remaining part of either the melting step or the expansion step performed before suspension after the operation of the discharge lamp enters the normal mode. In this case, the restoration mode is performed from the remaining process after the suspension after the driving of the discharge lamp enters the normal mode. Thus, predetermined power can be supplied to the respective electrodes in a stable manner.

It is preferable to further include a light modulation unit which receives illumination light emitted from the discharge lamp, and a projection system which projects image light having passed through the light modulation unit. In this case, the projector can project a high quality image having reduced flickering and color unevenness and maintaining stable illuminance for a long period.

A driving method of a light source for a projector (a) which contains a discharge lamp having a first electrode and a second electrode, emits light by generating discharge between the first and second electrodes, and changes duty ratio of alternating current waveform in a restoration mode according to a second aspect of the invention includes (b) melting surface layers of a tip and a surrounding area of the tip of one electrode by increasing the anode period of at least one of the first and second electrodes longer than the anode period of the other electrode, and (c) expanding a tip on a tip area of a main body of the one electrode by decreasing the anode period of the one electrode shorter than the anode period of the other electrode.

According to the driving method of the light source for the projector, the step of melting the surface layers of the tip and the surrounding area of the tip extending from the main body of the electrode more greatly damaged in the pair of the first and second electrodes, for example, and the step of expanding the tip of the main body of the one electrode are performed in the restoration mode. Thus, the positions and shapes of the tips of the electrodes are stabilized, and flickering and color unevenness are prevented. Accordingly, a high quality projection image can be maintained for a long period. Moreover, the tip having high heat capacity and wide contact area with the electrode main body can be formed on the one electrode by decreasing the anode period of the one electrode shorter than the anode period of the other electrode. Thus, illuminance of the discharge lamp can be maintained for a long period.

BRIEF DESCRIPTION OF THE DRAWINGS

The invention will be described with reference to the accompanying drawings, wherein like reference numbers are given to like elements.

DETAILED DESCRIPTION OF EMBODIMENTS

A structure and the like of a projector according to an embodiment of the invention are hereinafter described with reference to the drawings.

Figure 1:
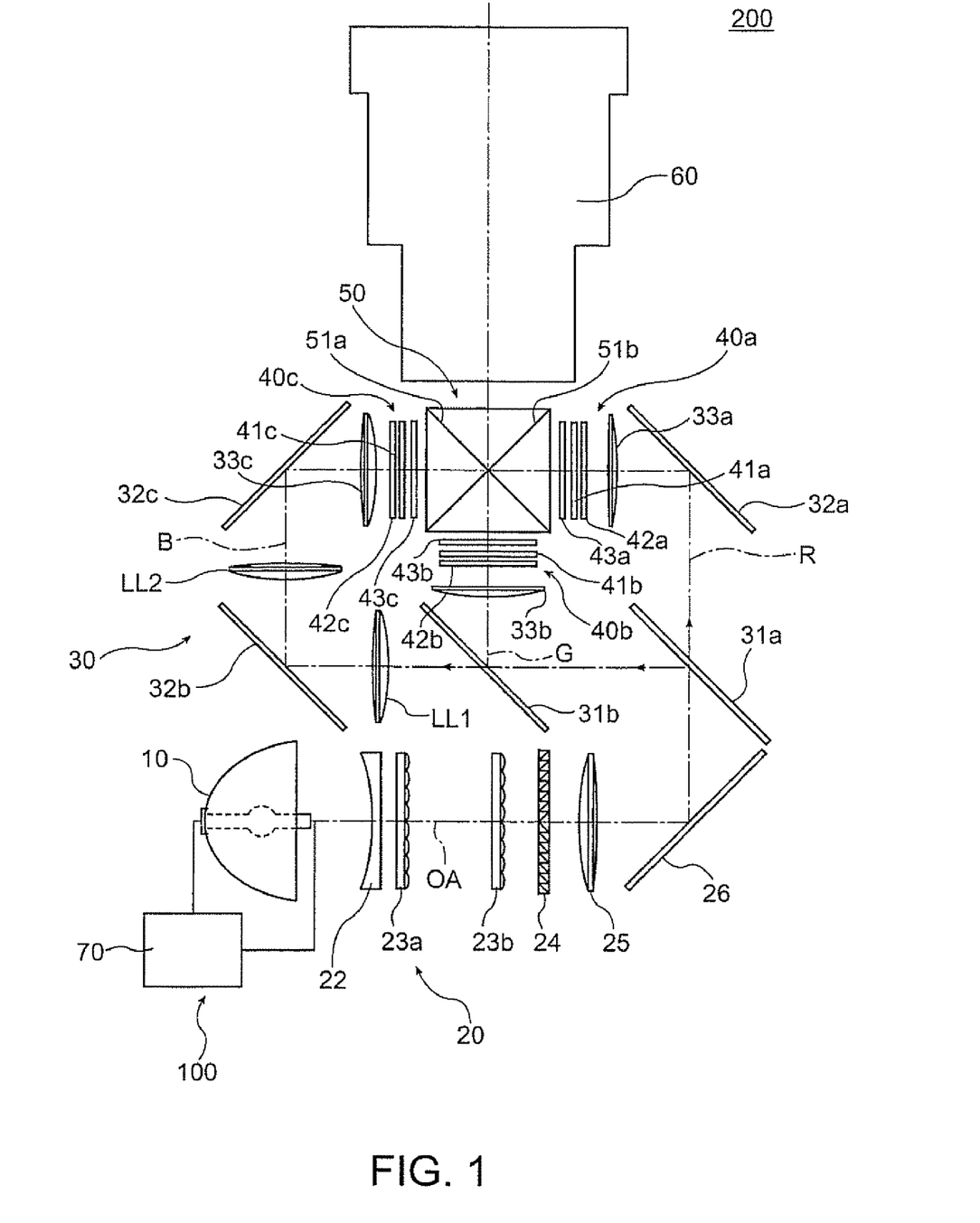
FIG. 1 illustrates a projector according to an embodiment of the invention.

FIG. 1 illustrates the concept of the structure of the projector in this embodiment. A projector 200 has a light source 100, an illumination system 20, a color separation system 30, liquid crystal light valves 40a, 40b and 40c, a cross dichroic prism 50, and a projection lens 60.

The light source 100 of the projector 200 has a light source unit 10 and a light source driving system 70, and emits light for illuminating the liquid crystal light valves 40a, 40b and 40c via the illumination system 20 and other components.

Figure 2:
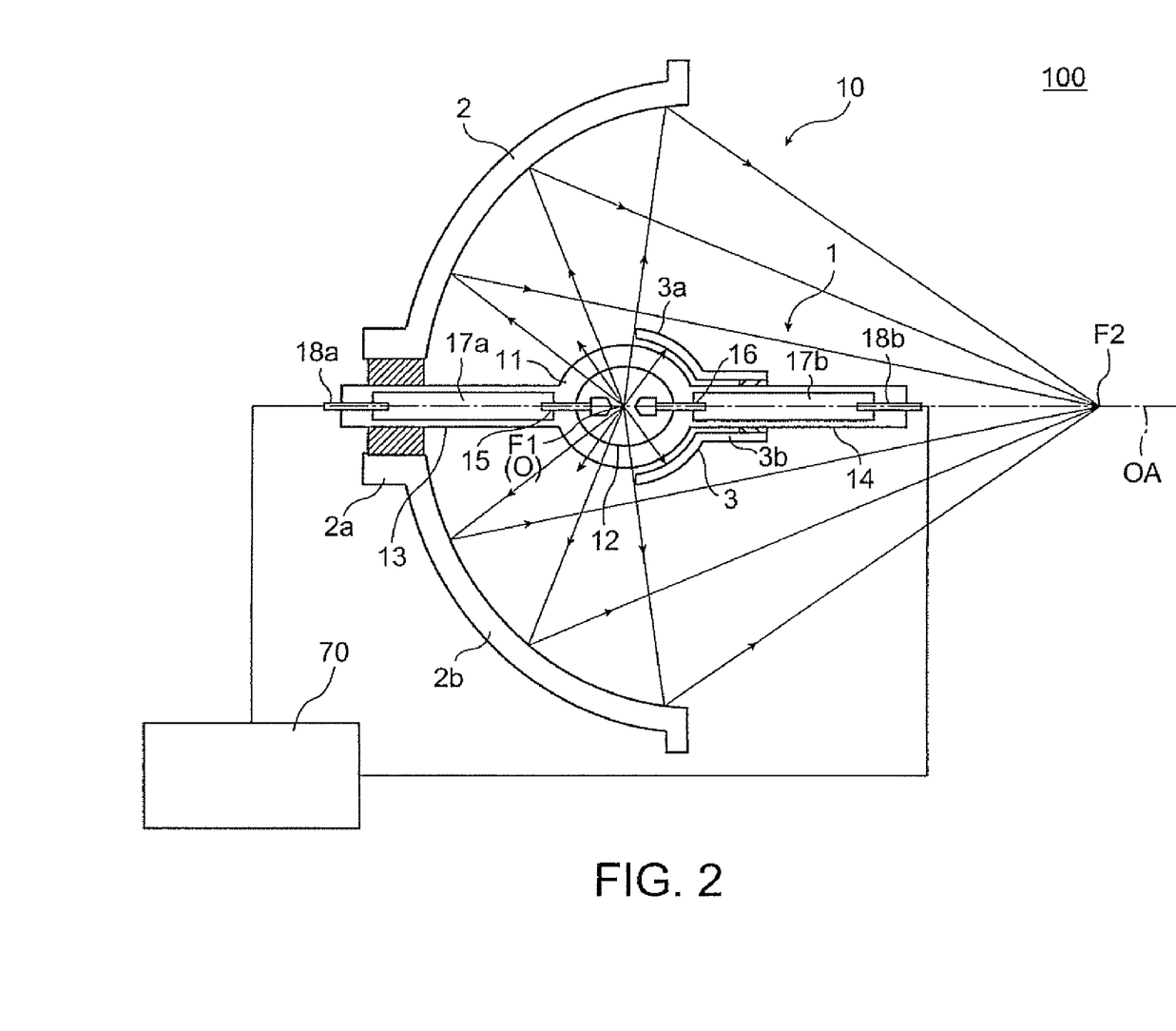
FIG. 2 is a cross-sectional view illustrating a light source unit.

FIG. 2 is a cross-sectional view schematically illustrating the structure of the light source 100. The light source unit 10 of the light source 100 has a discharge light emission type discharge lamp 1, a reflector 2 as a main elliptic reflection mirror, and a sub mirror 3 as a spherical sub reflection mirror.

The light source driving system 70, details of which will be described later, is an electric circuit which supplies alternating current to the light source unit 10 such that the light source unit 10 can emit light in a desired condition.

The discharge lamp 1 of the light source unit 10 is constituted by a quartz glass tube which transmits light and has an expanded central area in a spherical shape, and has a main body 11 for emitting illumination light, and first and second seal portions 13 and 14 extending along an axis passing both ends of the main body 11.

The tip of the first electrode 15 made of tungsten and the tip of the second electrode 16 similarly made of tungsten are disposed a predetermined distance away from each other in a discharge space 12 formed inside the main body 1. Gas as a discharge medium containing rare gas, metal halogen compound and the like is sealed into the discharge space 12. Metal foils 17a and 17b made of molybdenum and electrically connected with the roots of the first and second electrodes 15 and 16 provided on the main body 11 are inserted into the seal portions 13 and 14 extending from both ends of the main body 11. Each of the seal portions 13 and 14 is isolated from the surroundings directly or via glass material or the like. When alternating voltage is applied to leads 18a and 18b connected with the metal foils 17a and 17b by the light source driving system 70, are discharge is generated between a pair of electrodes 15 and 16 and the main body 11 emits light having high luminance. As apparent from FIG. 2, the reflector 2 is disposed on the first electrode 15 side, and the sub mirror 3 is disposed on the second electrode 16 side opposed to the reflector 2. Thus, the first electrode 15 is positioned on the side opposite to the sub mirror 3 with the main body 11 interposed therebetween.

Approximately half of the main body 11 of the discharge lamp 1 on the front side with respect to light emission is covered by the sub mirror 3. The sub mirror 3 is a component made of quartz glass and formed into one piece body. The sub mirror 3 has a sub reflection portion 3a for returning light released forward from the main body II of the discharge lamp 1 to the main body 11, and a support portion 3b fixed to the circumference of the second seal portion 14 while supporting the root of the sub reflection portion 3a. The support portion 3b into which the second seal portion 14 is inserted supports the sub reflection portion 3a in such a condition that the sub mirror 3a is aligned with the main body 11.

The reflector 2 is a component made of crystallized glass or quartz glass and formed into one piece body. The reflector 2 has a neck-shaped portion 2a into which the first seal portion 13 of the discharge lamp 1 is inserted, and an ellipsoidal main reflection portion 2b expanding from the neck-shaped portion 2a. The neck-shaped portion 2a into which the first seal portion 13 is inserted supports the main reflection portion 2b in such a condition that the main reflection portion 2b is aligned with the main body 11.

The discharge lamp 1 is disposed along a system optical axis OA corresponding to the optical axis of the main reflection portion 2b, and positioned such that a light emission center O located between the first and second electrodes 15 and 16 within the main body 11 coincides with a first focus F1 on the elliptic curved surface of the main reflection portion 2b. Light released from the main body 11 during light emission of the discharge lamp 1 is reflected by the main reflection portion 2b, or reflected initially by the sub reflection portion 3a and then by the main reflection portion 2b. Then, the reflected light converges at a second focus F2 on the elliptic curved surface. Thus, each of the reflector 2 and the sub mirror 3 has a substantially symmetric reflection curved surface with respect to the system optical axis OA, and the pair of the electrodes 15 and 16 are disposed such that their electrode axes can be approximately in correspondence with the system optical axis OA.

Figure 3:
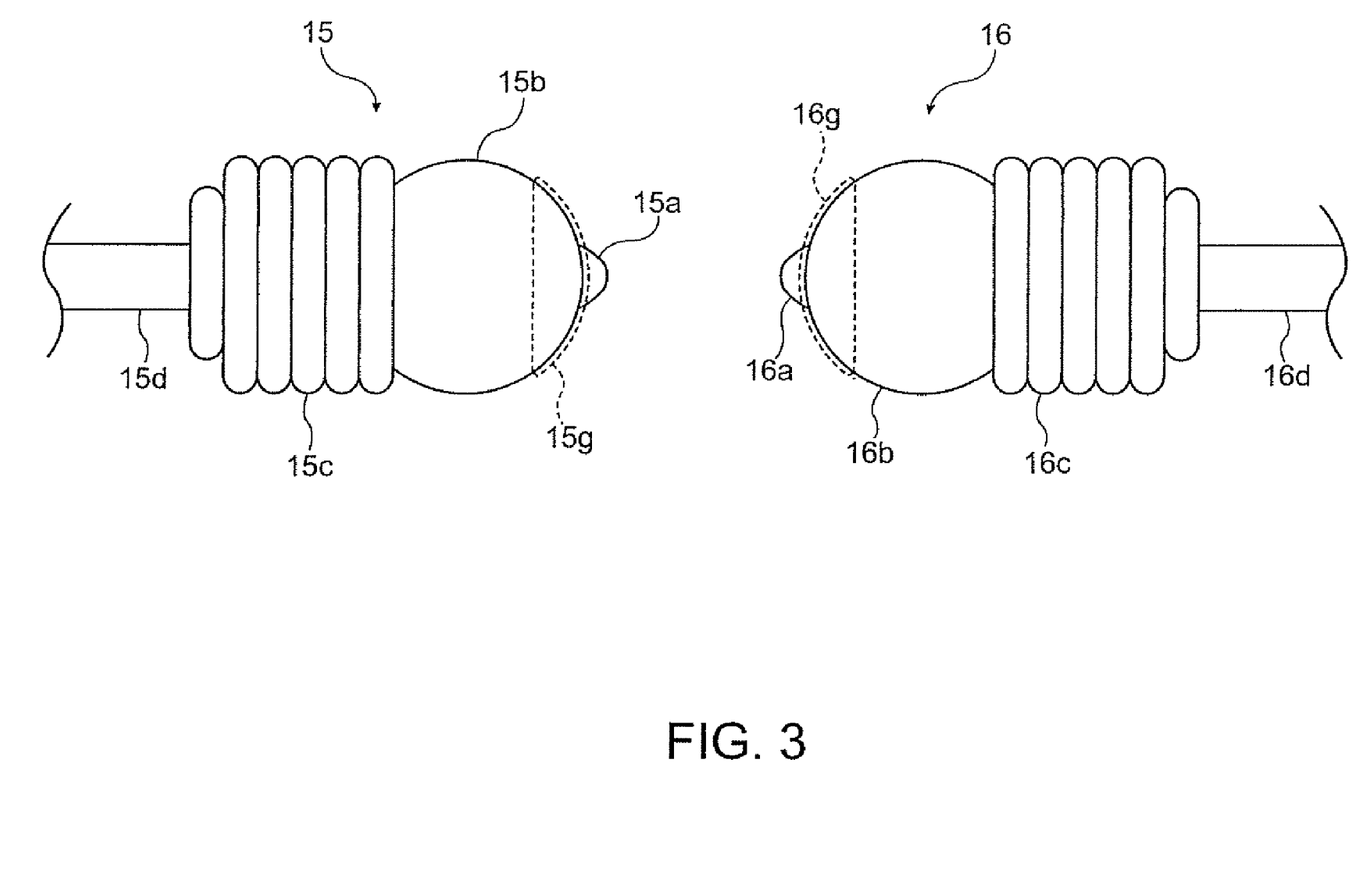
FIG. 3 illustrates enlarged tip areas of a pair of electrodes as an example.

FIG. 3 illustrates enlarged tip portions of the first and second electrodes 15 and 16 sealed within the discharge lamp 1. FIGS. 4A through 4D schematically illustrate condition changes of the tip portions of the first and second electrodes 15 and 16. The first and second electrodes 15 and 16 have tips 15a and 16a, main bodies 15b and 16b, coil portions 15c and 16c, and shafts 15d and 16d. The tip portions of the first and second electrodes 15 and 16 are formed by winding tungsten around the shafts 15d and 16d and heating and melting the tungsten. The remaining portions of the tungsten wound and not melted become the coil portions 15c and 16c. The masses of the main bodies 15b and 16b provided around the tips of the first and second electrodes 15 and 16 increase the heat capacity. It is possible to form the tips 15a and 16a as projections having the desired size in the space between the tip portions of the main bodies 15b and 16b by applying discharge or other processing to the electrodes 15 and 16 during manufacturing process of the electrodes 15 and 16 or at the finishing process after insertion of the electrodes 15 and 16 into the main body 11. The tips 15a and 16a of the first and second electrodes 15 and 16 determine the discharge distance between the electrodes during light emission of the discharge lamp 1, and thus have influence on the operation condition of the discharge lamp 1. The manufacturing method and shapes of respective parts of the first and second electrodes 15 and 16 discussed above are only examples.

The tips 15a and 16a of the first and second electrodes 15 and 16 are areas which chiefly receive collision of electrodes caused by discharge at the time of light emission from the arc tube 1. When the emission period of the arc tube 1 continues longer than a certain period, the surfaces of the tips 15a and 16a and tip areas 15g and 16g surrounding the tips 15a and 16a of the main bodies 15b and 16b are gradually roughed by heat and discharge. For example, small concaves and convexes generated on the surfaces of the tip areas 15g and 16g which extend around the tips 15a and 16a gradually grow and become large concaves and convexes 61 shown in FIG. 4A, causing flicker which continuously shifts the starting point of arc discharge between the concaves and convexes 61 and the tips 15a and 16a, and arc jump which completely shifts the starting point of arc discharge from the initial discharge starting position (including extension of arc length). In addition, concaves and convexes 63 generated on the surfaces of the tips 15a and 16a deform the tips 15a and 16a and produce smooth shapes of the tips 15a and 16a containing small concaves and convexes as shown in FIG. 4D, causing flicker and arc jump similarly to the above case. Such unstable discharge, shift of the light emission position and the like observed as flicker or arc jump lead to irregular fluctuations of illumination light emitted from the light source unit 10. When the illumination light emitted from the light source unit 10 irregularly fluctuates, the condition of light passing through the optical systems described later changes. This change has adverse effects (such as lowering of illuminance, flickering, color unevenness, luminance unevenness) on the quality of the projection image.

In order to avoid this situation, the light source 100 according to this embodiment restores the first and second electrodes 15 and 16 at an appropriate time. More specifically, the light source 100 smoothes the concaves and convexes 61 having increased ups and downs and the deformed tips 15a and 16a, and then executes operation in a restoration mode for forming new tips 15a and 16a. This restoration mode will be described later.

Returning to FIG. 1, the illumination system 20 has a collimating lens 22 as a light collimating unit for collimating the direction of light from the light source, first and second fly-eye lenses 23a and 23b constituting an integrator system for dividing light into partial lights and superimposing the partial lights, a polarization conversion element 24 for equalizing light polarization direction, a superimposing lens 25 for superimposing light having passed through the fly-eye lenses 23a and 23b, and a mirror 26 for bending optical path of light. The illumination system 20 produces substantially white equalized illumination light by using these components. The collimating lens 22 of the illumination system 20 converts illumination light emitted from the light source unit 10 into substantially collimated light. Each of the first and second fly-eye lenses 23a and 23b is constituted by a plurality of element lenses disposed in matrix. The element lenses constituting the first fly-eye lens 23a divides light having passed the collimating lens 22 into partial lights and converges the partial lights separately. The element lenses constituting the second fly-eye lens 23b converts the partial lights released from the first fly-eye lens 23a into lights having appropriate diffusion angle and releases the resultant lights. The polarization conversion element 24 has an array of PBS, mirror, retardation film and the like as a set of elements, and has a function of converting the partial lights divided by the first fly-eye lens 23a into one-directional linear polarized lights. The superimposing lens 25 appropriately converges the illumination lights having passed through the polarization conversion element 24 as a whole such that the illumination lights can be superimposed on the illumination receiving areas of liquid crystal light valves 40a, 40b and 40c as light modulation units for respective colors disposed downstream from the superimposing lens 25.

The color separation system 30 has first and second dichroic mirrors 31a and 31b, reflection mirrors 32a, 32b and 32c, and three field lenses 33a, 33b and 33c. The color separation system 30 separates the illumination light equalized by the illumination system 20 into three color lights in red (R), green (G) and blue (B), and introduces the three color lights to the liquid crystal light valves 40a, 40b and 40c disposed downstream. More specifically, the first dichroic mirror 31a transmits the R light of the three R, G and B lights and reflects the G and B lights. The second dichroic mirror 31b reflects the G light of the G and B lights and transmits the B light. Then, in the color separation system 30, the R light having passed the first dichroic mirror 31a passes the reflection mirror 32a and enters the field lens 33a for controlling the incident angle. The G light reflected by the first dichroic mirror 31a and further reflected by the second dichroic mirror 31b enters the field lens 33b for controlling the incident angle. The B light having passed the second dichroic mirror 31b passes relay lenses LL1 and LL2 and the reflection mirrors 32b and 32c, and enters the field lens 33c for controlling the incident angle.

The liquid crystal light valves 40a, 40b and 40c are non-emission type light modulation devices for modulating spatial intensity distribution of entering illumination light, and have three liquid crystal panels 41a, 41b and 41c receiving corresponding color lights released from the color separation system 30, three first polarizing filters 42a, 42b and 42c disposed on the light entrance sides of the liquid crystal panels 41a, 41b and 41c, and three second polarizing filters 43a, 43b and 43c disposed on the light exit sides of the liquid crystal panels 41a, 41b and 41c. The R light having passed through the first dichroic mirror 31a enters the liquid crystal light valve 40a via the filed lens 33a and the like to illuminate the liquid crystal panel 41a of the liquid crystal light valve 40a. The G light reflected by both the first and second dichroic mirrors 31a and 31b enters the liquid crystal light valve 40b via the field lens 33b and the like to illuminate the liquid crystal panel 41b of the liquid crystal light valve 40b. The B light having been reflected by the first dichroic mirror 31a and passed through the second dichroic mirror 31b enters the liquid crystal light valve 40c via the field lens 33c and the like to illuminate the liquid crystal panel 41c of the liquid crystal light valve 40c. The liquid crystal panels 41a through 41c modulate the spatial intensity distribution of the entering illumination light in the polarization direction to control the polarization conditions of the three color lights having entered the liquid crystal panels 41a through 41c for each pixel according to driving signals or image signals inputted as electric signals to the liquid crystal panels 41a through 41c. In this case, the first polarization filters 42a through 42c control the polarization directions of the illumination lights entering the liquid crystal panels 41a through 41c, and the second polarizing filters 43a through 43c extract modulated lights having predetermined polarization directions from the modulated lights released from the liquid crystal panels 41a through 41c. The liquid crystal light valves 40a, 40b and 40c form image lights in corresponding colors by these processes.

The cross dichroic prism 50 combines the image lights in respective colors released from the liquid crystal light valves 40a, 40b and 40c. More specifically, the cross dichroic prism 50 has a substantially squared shape in the plan view produced by affixing four rectangular prisms, and a pair of dielectric multilayer films 51a and 51b crossing at right angles in an X-shape are formed on the boundaries of the affixed rectangular prisms. The first dielectric multilayer film 51a reflects R light, and the other second dielectric multilayer film 51b reflects B light. The cross dichroic prism 50 reflects R light released from the liquid crystal light valve 40a by the dielectric multilayer film 51a such that the R light can be released to the right with respect to the traveling direction. The cross dichroic prism 50 directs the G light released from the liquid crystal light valve 40b such that the G light can advance straight to be released via the dielectric multilayer films 51a and 51b. The cross dichroic prism 50 reflects B light released from the liquid crystal light valve 40c by the dielectric multilayer film 51b such that the R light can be released to the left with respect to the traveling direction. The cross dichroic prism 50 combines the R, G and B lights by these processes to produce combined light as image light for forming a color image.

The projection lens 60 is a projection system which enlarges the image light as the combined light released from the cross dichroic prism 50 with desired expansion rate, and projects a color image on a screen (not shown).

The light source 100 is now described in more detail.

Figure 4A:
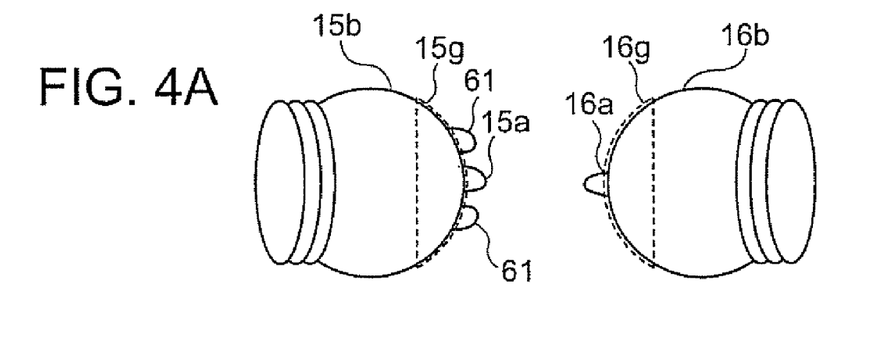
FIGS. 4A through 4D schematically illustrate condition changes of the tips areas of the electrodes shown in FIG. 3.

FIG. 4A shows a condition of the concaves and convexes 61 produced on the tip area 15g of the first electrode 15 while the light source unit 10 is emitting light in the normal mode. In this case, the discharge starting point shifts between the tip 15a and the concaves and convexes 6l, that is, flicker or arc jump occurs. Flicker generates flickering, and arc jump lowers illuminance.

Figure 4B:
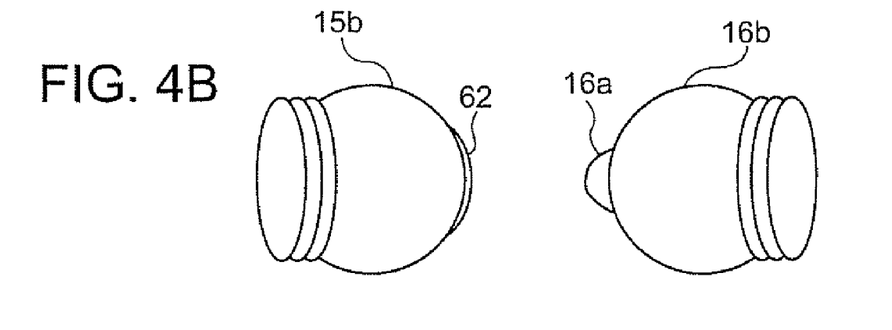

FIG. 4B shows the operation of the light source unit 10 switched to the restoration mode after flicker or arc jump is detected. In this mode, the first electrode 15 on which the concaves and convexes 61 causing flicker or arc jump are generated is heated to melt the concaves and convexes 61 and the tip 15a and smooth out these during light emission operation in a first restoration step, and simultaneously the tip 16a having large heat capacity and wide contacting area with the main body 16b is formed on the second electrode 16.

Figure 4C:
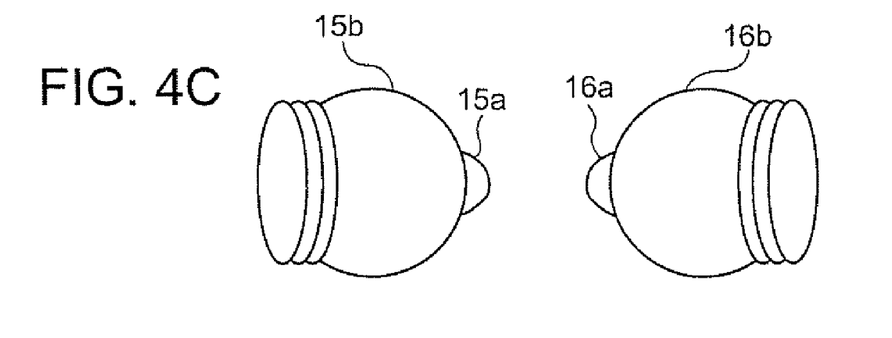
Figure 4D:
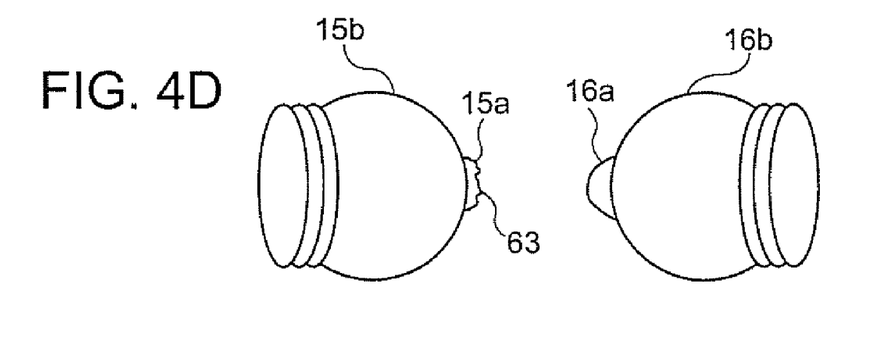

FIG. 4C shows a condition in a second restoration step. In this step, the tip 15a of the first electrode 15 expands after smoothing the surface of the tip area 15g of the first electrode 15 and forming the tip 16a which has large heat capacity and wide contacting area with the main body 16b on the second electrode 16 in the first restoration step.

On the other hand, when the concaves and convexes 61 generated on the tip area 16g of the second electrode 16 and resultant flicker or arc jump are detected on the second electrode 16, the second electrode 16 is heated to melt the concaves and convexes 61 and the tip 16a and smooth these in the first restoration step. Simultaneously, the tip 15a having large heat capacity and wide contact area with the main body 15b is formed on the first electrode 15. Then, the tip 16a of the second electrode 16 expands in the second restoration step.

FIG. 4D shows the top shape of the tip 15a of the first electrode 15 deformed to such an extent that the projection of the tip 15a close to the second electrode 16 is remarkably lost. In this case, flicker or arc jump similarly occurs.

Figure 5:
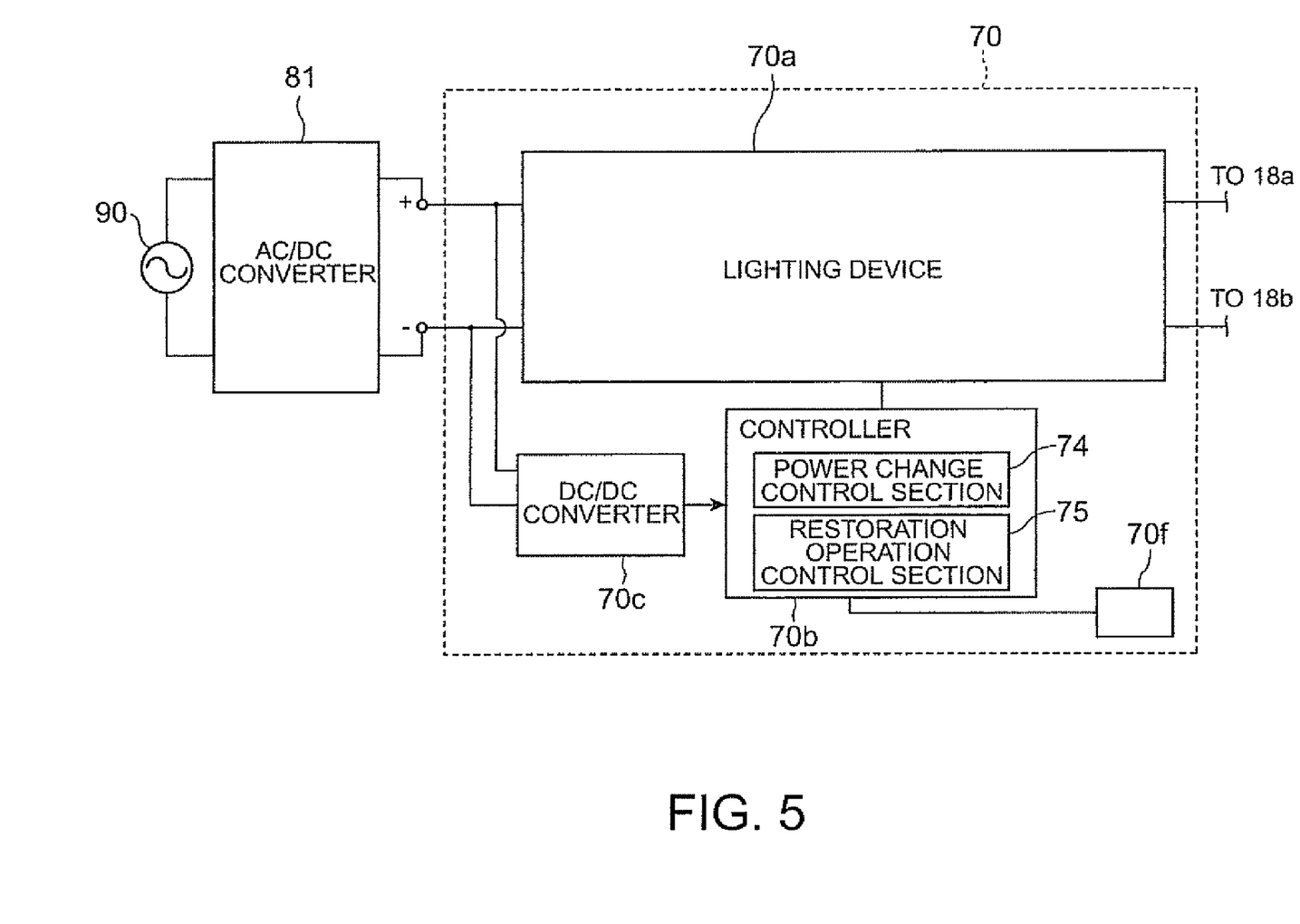
FIG. 5 is a block diagram showing a structure of a current driving system included in the light source unit.

FIG. 5 is a block diagram schematically illustrating a structure of a light source driving system 70 which drives the light source unit 10 shown in FIGS. 1 and 2. The light source driving system 70 generates alternating current supplied for generating discharge between the pair of the electrodes 15 and 16 shown in FIG. 2 and other figures, and controls the supply condition of the alternating current supplied to the electrodes 15 and 16. The light source driving system 70 has a lighting device 70a, a controller 70b, a DC/DC converter 70c, and a flicker sensor 70f. In these components, the lighting device 70a and the controller 70b constitute a driving unit for supplying electric power to the discharge lamp 1. In this embodiment, the light source driving system 70 uses an external power source. More specifically, the light source driving system 70 is connected with an AC/DC converter 81, and the AC/DC converter 81 is connected with a commercial power source 90. The AC/DC converter 81 converts alternating current supplied from the commercial power source 90 into direct current.

The lighting device 70a is a circuit part which actuates the light source unit 10 shown in FIG. 1 or other figures for light emission from the light source unit 10. The lighting device 70a controls output frequency, duty ratio, positive-negative voltage ratio, output waveform, and the like of the light source driving system 70, and outputs arbitrary waveform such as rectangular waveform and triangular waveform.

The controller 70b is constituted by a microprocessor or the like, and controls the lighting device 70a. The controller 70b is driven by appropriate driving voltage generated from the DC/DC converter 70c as the power source.

The controller 70b has a control function for commanding the light source unit 10 to perform various operations. More specifically, a power change control section 74 provided on the controller 70b controls the lighting device 70a such that the light source unit 10 can start light emission by discharge at the beginning of lighting. Then, the power change control section 74 drives the light source unit 10 by alternating constant current by controlling the lighting device 70a at the following startup. Thereafter, the power change control section drives the light source unit 10 by constant power alternating current by controlling the lighting device 70a at the subsequent stable operation, i.e., in the normal mode.

The flicker sensor 70f is a detection unit having a photo diode, an amplifier, a trigger circuit, and other components, and detects variations in voltage between the first and second electrodes 15 and 16 and noise-like variations in arc intensity as disorder of a light detection signal, for example. The flicker sensor 70f is disposed at an appropriate position within the light source unit 10 or the illumination system 20, and operates under the control of the controller 70b. Thus, the controller 70b monitors the detection output from the flicker sensor 70f and which of the first and second electrode 15 and 16 is the cathode. When detecting flicker or arc jump, the flicker sensor 70f specifies which of the first and second electrodes 15 and 16 is causing the electrode abnormal condition. Then, a restoration operation control section 75 of the controller 70b operates in the restoration mode for preventing flicker or are jump.

Figure 6A:
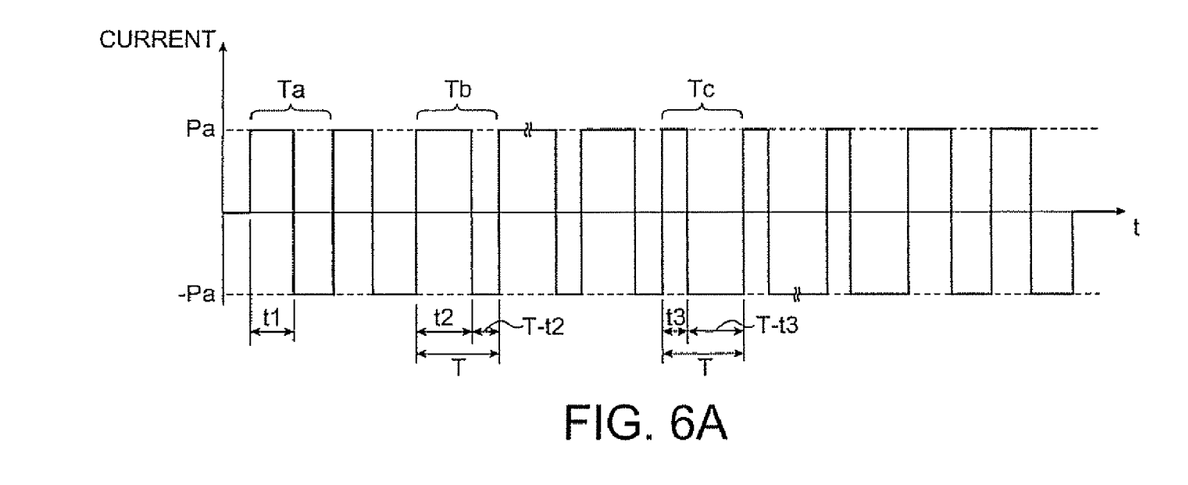
FIGS. 6A through 6C are graphs showing operation waveforms and the like as an example.
Figure 6B:
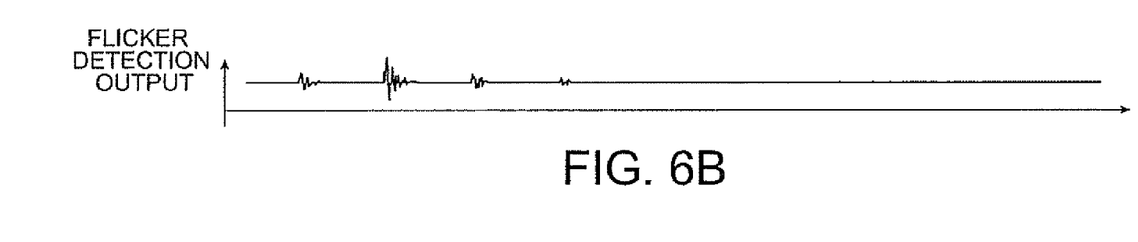
Figure 6C:
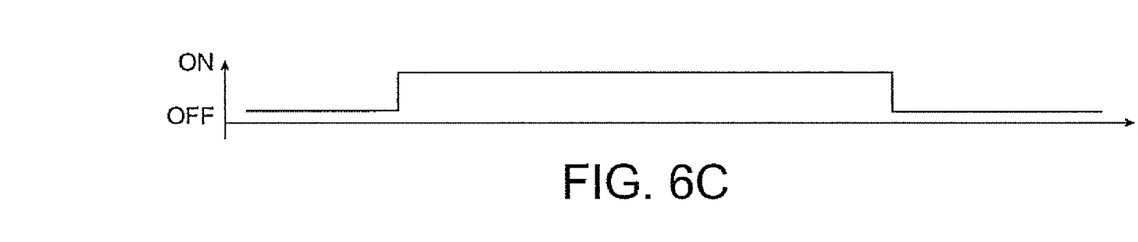

FIG. 6A is a graph showing an example of alternating current waveform of the light source driving system 70. FIG. 6B is a graph showing output from the flicker sensor 70f. FIG. 6C is a graph showing operation timing in the restoration mode. In FIGS. 6A through 6C, the horizontal axes indicate time in all these figures, and the vertical axes indicate current supplied to the first electrode 15 in FIG. 6A, the flicker detection output in FIG. 6B, and on-off of the restoration mode in FIG. 6C. As shown in FIG. 6A, the alternating current waveform is constituted by three types of waveform, i.e., a normal mode waveform Ta, a first restoration waveform Tb, and a second restoration waveform Tc.

The supply current corresponding to the supply energy for the electrodes 15 and 16 has duty ratio of 0.5, for example, under the normal mode waveform Ta. In this case, the current is kept at Pa while the first electrode 15 is in the anode period, and kept at −Pa while the first electrode 15 is in the cathode period. According to FIG. 6B, the output from the flicker sensor 70f is detected as a noise-like signal while the first electrode 15 is in the cathode period. More specifically, when the large concaves and convexes 61 are produced or when the tip 15a is deformed due to the roughed surface of the tip area 15g of the first electrode 15, flicker or arc jump exceeding the allowed limit is caused while the first electrode 15 is in the cathode period. While FIG. 6B shows the case where flicker is caused by the concaves and convexes 61 and deformation of the tip 15a generated on the first electrode 15 side, there is a possibility that flicker is caused by the concaves and convexes 61 and deformation of the tip 16a generated on the second electrode 16 side. In this case, a noise-like signal is detected while the current of the first electrode 15 is positive, i.e., while the second electrode 16 is the cathode. As shown in FIG. 6C, the controller 70b outputs a restoration mode signal for commanding the lighting device 70a to operate in the restoration mode. In the figure, anode periods t1, t2 and t3 of the first electrode 15 (cathode periods of second electrode 16) correspond to periods where current is positive, and cathode periods T-t1, T-t2 and T-t3 of the first electrode 15 (anode periods of second electrode 16) correspond to periods where current is negative. In this case, T indicates one cycle. As apparent from FIG. 6A, the light source driving system 70 controls power by controlling the time ratio of the anode periods t1, t2 and t3 to the cathode periods T-t1, T-t2 and T-t3 of the first electrode 15. In this embodiment, relations t1-T-t1, T2>T-t2, t3<T-t3 hold. Thus, the duty ratio of the first restoration waveform Tb in the first restoration step is opposite to the duty ratio of the second restoration waveform Tc in the second restoration step.

In the first restoration step, the light source driving system 70 operates under the first restoration waveform Tb where the anode period t2 of the first electrode 15 in one cycle is longer than the cathode period. As a result, the energy in the anode period becomes larger than the energy in the cathode period in the first electrode 15 on which flicker or arc jump is caused, and the surface of the tip area 15g is temporarily smoothed by melting (see FIG. 4B). In this description, the supply energy for each of the electrodes 15 and 16 during the anode period refers to cumulative value of power consumption during the period when the related electrode functions as the anode. On the other hand, the second electrode 16 as the other electrode can produce the tip 16a having large heat capacity and a wide contact area with the main body 16b by decreasing the energy during the anode period to a level smaller than the energy during the cathode period (T-t2). Then, the driving under the first restoration waveform Tb is maintained for a predetermined period.

In the second restoration step, the light source driving system 70 operates under the second restoration waveform Tc where the anode period t3 of the first electrode 15 is shorter than the cathode period of the first electrode 15. As a result, the energy during the anode period becomes smaller than the energy during the cathode period in the first electrode 15, and thus the tip 15a grows (see FIG. 4C). On the other hand, the energy during the anode period becomes larger than the energy during the cathode period in the second electrode 16, and surface layers of the tip 16a and the tip area 16g are slightly melted. However, the tip 16a having large heat capacity and wide contact area with the main body 16b has been formed in the first restoration step, and the position and shape of the tip 16a are maintained.

After the driving under the second restoration waveform Tc is maintained for a predetermined period, the length of the anode period of the first electrode 15 is returned to t1. That is, the first and second restoration waveforms Tb and Tc are returned to the normal mode waveform Ta.

According to the specific conditions in this embodiment, the anode period ratio a=t2/T and b=t3/T in the restoration mode are determined in the ranges of $0.5<a<1$ and $0<b<0.5$, respectively.

It is conjectured that the projections grow on the second electrode 16 having the long cathode period under the condition where the first electrode 15 has the long anode period and short cathode period and where the second electrode 16 has the short anode period and long cathode period for the following mechanism.

When the first electrode 15 is the anode, the temperature of the electrode is high due to the long anode period. Thus, tungsten evaporates from the main body 15b of the first electrode 15. The evaporated tungsten becomes cations, which move toward the second electrode 16 as the cathode by electrostatic force. At this time, the temperature of the second electrode 16 is low due to the short anode period, and thus tungsten easily adheres to the second electrode 16. Thus, the tungsten having evaporated from the first electrode 15 and become cations moves close to the second electrode 16, and then adheres to the second electrode 16. Similar phenomenon occurs when the first electrode 15 and the second electrode 16 are the cathode and the anode, respectively. However, this term is shorter than that when the polarities are reversed, and the temperature of the second electrode 16 does not become high. In this case, the electrode evaporation amount from the second electrode 16 is small. Thus, the evaporation amount is larger than the adhesion amount in case of the first electrode 15, while the adhesion amount is larger than the evaporation amount in case of the second electrode 16. As a result, the projections grow on the second electrode 16.

Figure 7:
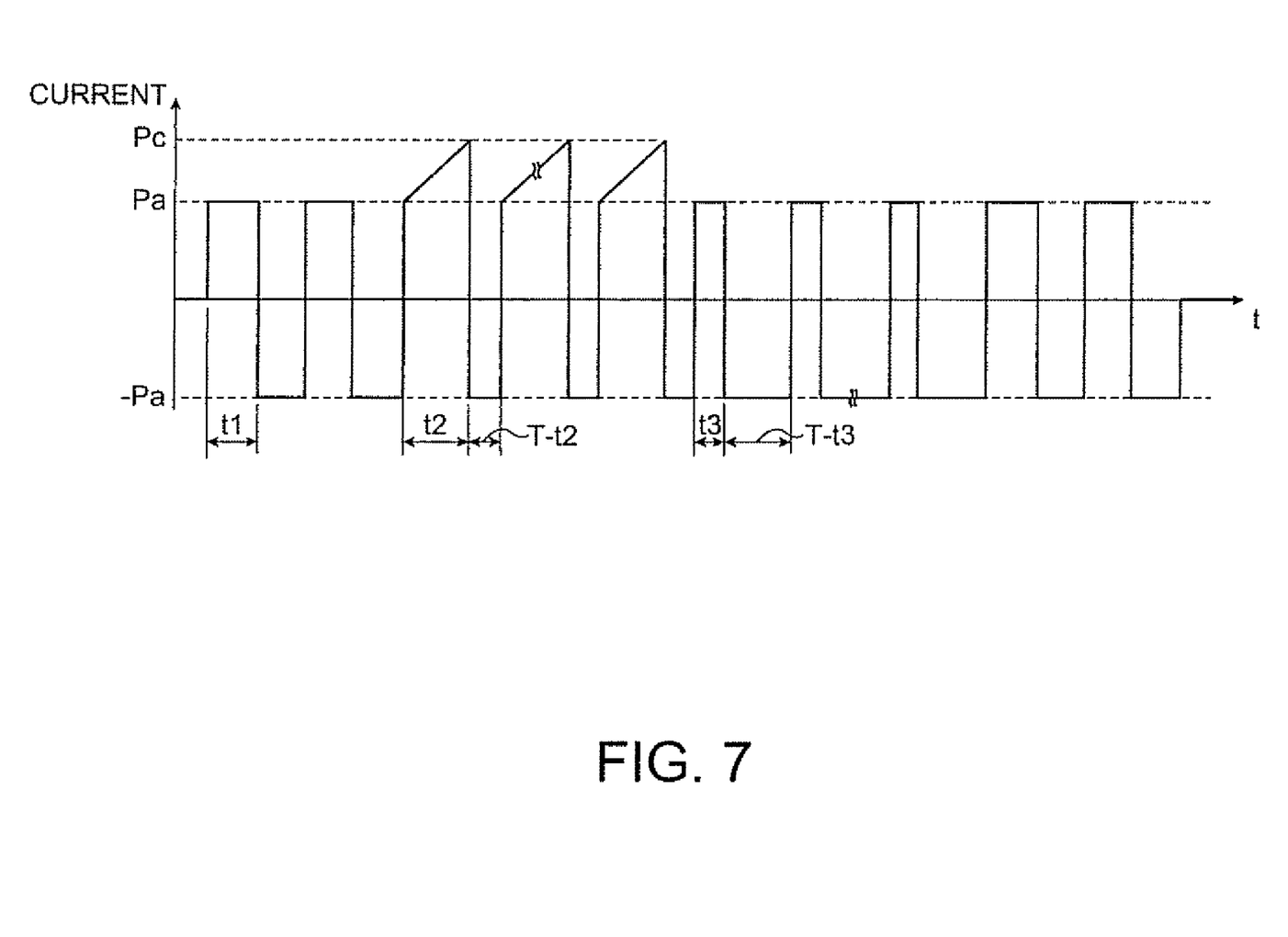
FIG. 7 is a graph showing operation in a modified example of FIG. 6A.

FIG. 7 is a graph showing a modified example of the operation of the light source driving system 70 shown in FIG. 6A. In this case, supply current is increased when the restoration mode signal is ON. According to this step, sawtooth waveform is superimposed on the original rectangular waveform of the first restoration waveform Tb to produce triangular waveform having the controlled peak value (such as Pc). Then, waveform similar to the second restoration waveform Tc shown in FIG. 6A is given, and the waveform is returned to the original rectangular waveform of the normal mode waveform Ta. According to this example, prevention of flicker and reduction of flickering of illumination light caused by the extremely lowered temperature of the electrode (first electrode 15 or second electrode 16) having the long cathode period can be achieved by converting the alternating current waveform of the polarity having longer period in the two polarities in each cycle into triangular waveform. In this example, the surfaces of the tip areas 15g and 16g are similarly smoothed by the operation in the restoration mode, and the tips 15a and 16a are formed on the electrodes 15 and 16. The current increase by conversion into triangular waveform is not limited to uniform increase as illustrated in the figure, but may be established as various types of waveform as long as the alternating current waveform peak at least in the longer period of the two polarity periods in one cycle lies immediately before the polarity switch. By this method, constant flickering and luminance unevenness can be prevented, and color unevenness and luminance decrease in the projection image can be reduced for a long period.

Operation in the restoration mode is now described in detail.

Figure 8:
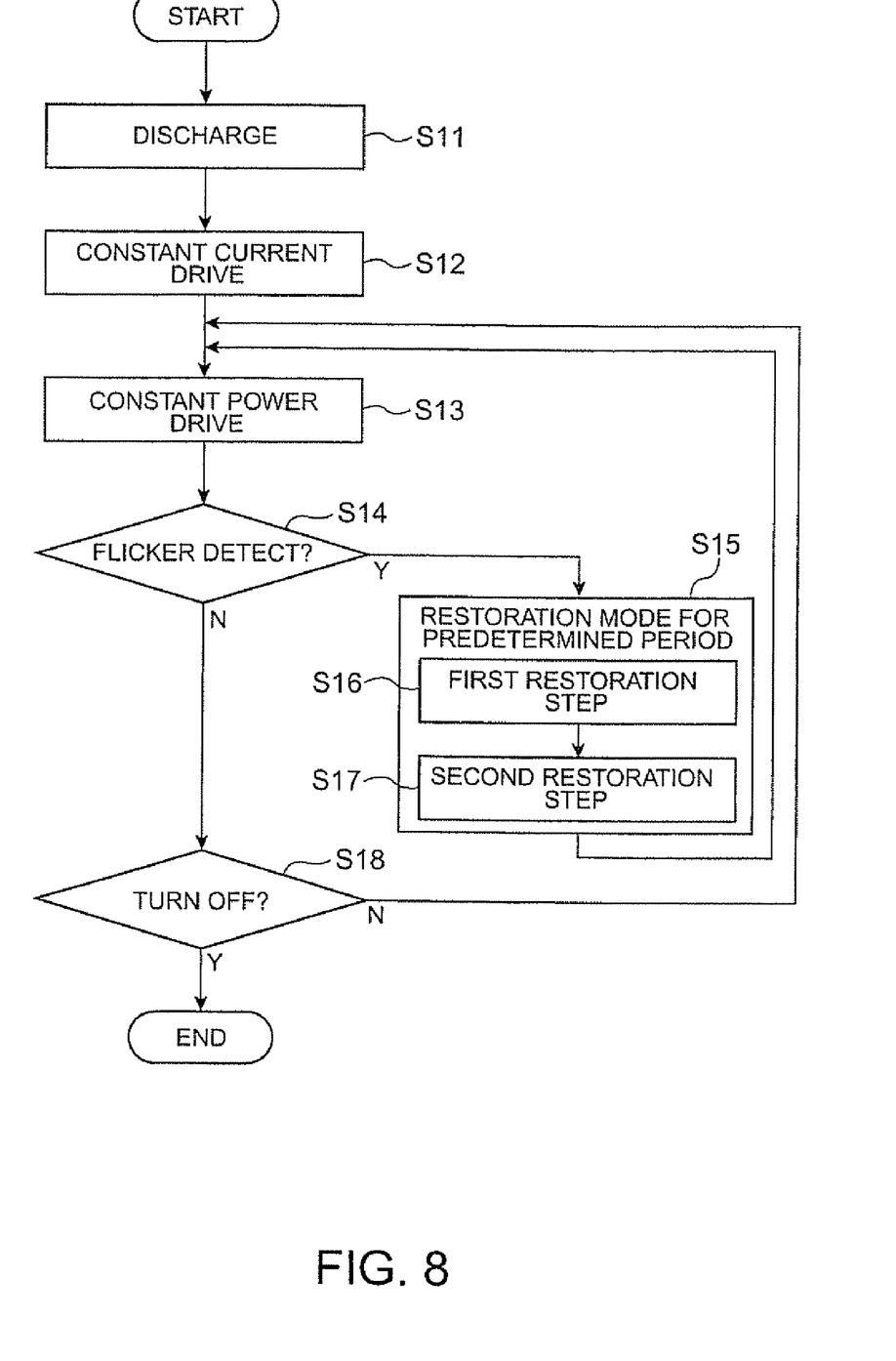
FIG. 8 is a flowchart showing operation of the light source unit.

FIG. 8 is a flowchart showing an operation example of the light source driving system 70.

The restoration operation control section 75 initiates the restoration mode when detecting flicker or arc jump exceeding the allowed value. The operation in the restoration mode contains the first restoration step and the second restoration step.

The controller 70b detects operation of a turning-on switch and starts operation. Initially, the controller 70b operates the lighting device 70a such that the discharge lamp 1 of the light source unit 10 can start discharge (step S11).

Then, the controller 70b operates the lighting device 70a in an appropriate manner via the power change control section 74 such that the discharge lamp 1 of the light source unit 10 can emit light by constant current (step S12). By this process, the luminance of arc of the light source unit 10 gradually increases to a target luminance value.

When detecting that power supplied to the discharge lamp 1 of the light source unit 10 reaches the target value, the controller 70b operates the lighting device 70a in an appropriate manner via the power change control section 74 to switch to the normal mode for supplying constant power to the arc tube 1 (step S13). By this process, the discharge lamp 1 of the light source unit 10 can emit light having target luminance.

Then, the controller 70b judges whether large flicker or arc jump exceeding the allowed limit is produced based on the output from the flicker sensor 70f (step S14).

When the flicker sensor 70f detects flicker exceeding the limit in step S14, the controller 70b operates the lighting device 70a in an appropriate manner via the restoration operation control section 75 to restore the main bodies 15b and 16b of the electrodes 15 and 16 sealed into the discharge lamp 1. That is, the restoration operation control section 75 of the controller 70b operates only for a predetermined period in the restoration mode for adjusting duty ratio of alternating current waveform for the electrodes 15 and 16 (step S15).

In the restoration mode, the controller 70b initially drives the discharge lamp 1 under the first restoration waveform Tb under which the supply energy supplied for the one electrode having been the cathode at the time of detection of flicker or arc jump while the one electrode is in the anode period becomes larger than the supply energy supplied for the other electrode while the other electrode is in the anode period, and heats and melts the surface layer of the tip area of the main body of the corresponding electrode (step S16). In the first restoration step, the restoration operation control section 75 increases the supply energy only for the one electrode of the first and second electrodes 15 and 16 as the electrode having been the cathode at the time of detection of flicker or arc jump exceeding the allowed limit while the one electrode is in the anode period for a predetermined time via the lighting device 70a. More specifically, under the condition shown in FIGS. 6A through 6C, the restoration operation control section 75 controls duty ratio of alternating current waveform for the first and second electrodes 15 and 16 to increase anode duty ratio (proportion of anode period in alternating output) of the first electrode 15 (the one electrode) of the pair of the electrodes 15 and 16 as the electrode having been the cathode at the time of detection of flicker exceeding the allowed value. As a result, under the first restoration waveform Tb, the anode period of the first electrode 15 on which the concaves and convexes 61 causing flicker are produced is longer than that of the second electrode 16 (the other electrode), and the cathode period of the second electrode 16 is longer than that of the first electrode 15. The discharge lamp 1 is driven under the first restoration waveform Tb having this duty ratio for a predetermined period until the concaves and convexes 61 produced on the tip area 15g of the main body 15b of the first electrode 15 and the tip 15a disappear by melting with sufficient growth of the tip 16a having a large heat capacity and a wide contact area with the main body 16b and not easily damaged on the second electrode 16 as shown in FIG. 4B.

Then, the controller 70b executes the second restoration step for driving the discharge lamp 1 under the second restoration waveform Tc where the supply energy for the one electrode whose tip is melted in the first restoration step during the anode period of the one electrode becomes smaller than the supply energy for the other electrode during the anode period of the other electrode to expand the tip of the one electrode (step S17). In the second restoration step, the restoration operation control section 75 increases the supply energy only for the one electrode whose tip has been melted in the first restoration step during the cathode period of the one electrode by using the lighting device 70a for a predetermined period. More specifically, under the condition shown in FIGS. 6A through 6C, the restoration operation control section 75 controls duty ratio of alternating current waveform for the first and second electrodes 15 and 16 to increase cathode duty ratio (proportion of cathode period in alternating output) of the first electrode 15 (the one electrode) whose tip 15a has been melted in the first restoration step. As a result, under the second restoration waveform Tc, the cathode period of the first electrode 15 whose tip has been melted in the first restoration step is longer than that of the second electrode 16 (the other electrode), and the anode period of the second electrode 16 is longer than that of the first electrode 15. The discharge lamp 1 is driven under the second restoration waveform Tc having this duty ratio for a predetermined period until the tip 15a having a large heat capacity and a wide contact area with the main body 15b sufficiently grow on the first electrode 15 as shown in FIG. 4C. Then, the anode duty ratio of the first electrode 15 is returned to the original value to switch to the normal operation for supplying constant power to the arc tube 1. By this process, the operation of the light source unit 10 returns to the normal mode in step S13, and the anode duty ratio of the first electrode 15 returns to the original normal value. Consequently, the discharge lamp 1 starts receiving constant power supply.

When flicker exceeding the limit is not detected in step S14, the controller 70b judges the condition as the normal mode, and detects whether a turning-off signal has been issued (step S18). When the turning-off signal is not detected, the process returns to step S13 to maintain the normal mode for supplying constant power to the discharge lamp 1. When the turning-off signal is detected, power supply to the discharge lamp 1 is stopped to suspend light emission from the discharge lamp 1.

On the contrary, when the electrode having been the cathode at the time of detection of flicker or arc jump exceeding the limit by the flicker sensor 70f in step S14 is the second electrode 16, the first restoration step in step S16 and the second restoration step in step S17 are performed as follows.

In the first restoration step, the restoration operation control section 75 increases the anode duty ratio (proportion of anode period in alternating output) of the second electrode 16 (one electrode) of the first and second electrodes 15 and 16 as the electrode having been the cathode at the time of detection of flicker exceeding the allowed value by controlling the duty ratio of the alternating current waveform for the first and second electrodes 15 and 16. More specifically, under the first restoration waveform Tb, the anode period of the second electrode 16 on which the concaves and convexes 61 causing flicker are produced is longer than that of the first electrode 15 (the other electrode), and the cathode period of the first electrode 15 is longer than that of the second electrode 16. The discharge lamp 1 is driven under the first restoration waveform Tb having this duty ratio for a predetermined period until the concaves and convexes 61 produced on the tip area 16g of the main body 16b of the second electrode 16 and the tip 16a disappear by melting with sufficient growth of the tip 15a having a large heat capacity and a wide contact area with the main body 15b and not easily damaged on the first electrode 15.

In the second restoration step, the restoration operation control section 75 increases the cathode duty ratio (proportion of cathode period in alternating output) of the second electrode 16 (one electrode) whose tip 16a has been melted in the first restoration step by controlling the duty ratio of the alternating current waveform for the first and second electrodes 15 and 16. More specifically, under the second restoration waveform Tc, the cathode period of the second electrode 16 whose tip has been melted in the first restoration step is longer than that of the first electrode 15 (the other electrode), and the anode period of the first electrode 15 is longer than that of the second electrode 16. The discharge lamp 1 is driven under the second restoration waveform Tc having this duty ratio for a predetermined period until the tip 16a having a large heat capacity and a wide contact area with the main body 16b sufficiently grow on the second electrode 16.

In the above processes, each of the predetermined periods during which the first and second restoration steps are performed is a term required for forming a sufficient tip having a large heat capacity and a wide contact area with the main body on the electrode which receives reduced supply energy during the anode period considering energy to be supplied, duty ratio, and parameters of the discharge lamp 1. The predetermined periods are established based on simulations and experiments performed in advance. For example, each of the first and second restoration steps is continued for several seconds to several hours.

The operation in the restoration mode can be performed not only by controlling the anode period but also by controlling current, waveform and the like of the lighting device 70a. For achieving these operations, the power change control section 74 manages the operation of the lighting device 70a and controls driving voltage and driving current supplied from the lighting device 70a to the leads 18a and 18b of the lighting unit 10 shown in FIG. 2 under the control program. By this control, the alternating current waveform for the electrodes 15 and 16 can be appropriately adjusted. More specifically, the maximum absolute value of current during the anode period and the cathode period can be controlled, or the peak height of the triangular waves obtained by superimposing sawtooth-shaped waveform on the rectangular waves can be controlled.

The restoration mode is not required to be combined with the detection of flicker or arc jump, but may be performed at appropriate time intervals such as from 5 hours to 200 hours, preferably from 10 hours to 100 hours intervals even when flicker or arc jump exceeding the allowed limit is not detected. In this case, the positions and shapes of the tips 15a and 16a of the first and second electrodes 15 and 16 can be similarly stabilized for a long period by regularly performing the restoration mode.

The operation in the restoration mode is not executed until the discharge lamp 1 enters the normal mode after startup under the control of the controller 70b. By the operation in the restoration mode under the condition where the discharge lamp 1 is maintained in the normal mode, predetermined power can be supplied to the electrodes 15 and 16 in a stable manner, and thus the electrodes 15 and 16 can be securely restored.

When the first restoration step (step S16) or the second restoration step (step S17) for the tips 15a and 16a is suspended in the restoration mode, the remaining part of the operation executed before suspension can be carried out after the driving condition of the discharge lamp 1 comes to the normal mode. For example, when the restoration mode is suspended in the middle of the first restoration step, the electrodes 15 and 16 not yet completely restored are again melted in the next normal mode. When the restoration mode is suspended in the middle of the second restoration step, the tips 15a and 16a not yet completely restored are again expanded in the next normal mode. By this method, predetermined power can be supplied to the electrodes 15 and 16 in a stable manner, and thus the electrodes 15 and 16 can be securely restored.

According to the light source 100 described above, the light source driving system 70 as the driving device operates in the restoration mode when flicker or arc jump exceeding the allowed value is detected. In the restoration mode, the light source driving system 70 initially increases supply energy for one electrode of the pair of the electrodes 15 and 16 as the electrode causing flicker or arc jump according to judgment during the anode period of the one electrode for a predetermined time, and then increases supply energy for the other electrode during the anode period of the other electrode for a predetermined time. By the operation in the restoration mode, either the electrode 15 or the electrode 16 on which the concaves and convexes 61 or deformation causing flicker or arc jump is produced is melted and the tip is again formed. Thus, the positions and shapes of the tips 15a and 16a again formed are stabilized, and thus flicker or arc jump is not caused. In addition, in the structure where the duty ratio of the alternating current waveform for the discharge lamp 1 is not equalized, the tip 15a or 16a having sufficiently large heat capacity and a sufficiently wide contact area with the main body 15b or 16b can be formed, and therefore durability is increased. In this case, restoration of the electrodes 15 and 16 can be achieved, and also the projection positions and shapes of the tips 15a and 16a of the electrodes 15 and 16 are stabilized for a long period. Thus, undesirable discharge is not produced on the tip areas 15g and 16g around the tips 15a and 16a, and flicker, arc jump, and extension of arc length can be thus prevented. As a result, arc can be generated between the restored tips 15a and 16a in a stable manner, and stable light can be supplied to the optical systems disposed downstream. Therefore, flickering and light angle variations of the illumination light emitted from the light source unit 10 are reduced, and thus flickering, color unevenness, illuminance decrease, and luminance decrease in a projection image are prevented. Accordingly, a projection image having high quality can be maintained for long periods.

The invention is not limited to the embodiments described herein, and it is therefore intended that various modifications may be made without departing from the scope and spirit of the invention. For example, the following changes are possible.

According to the light source 100 explained above, the normal mode waveform Ta may be inserted between the first restoration waveform Tb and the second restoration waveform Tc. Alternatively, other alternating current waveform may be inserted between respective continuous sets of the first restoration waveform Tb, the second restoration waveform Tc, and the normal mode waveform Ta. The duty ratio and the like of the first restoration waveform Tb and the second restoration waveform Tc may be established for each of the alternating current waveforms. Each cycle of the normal mode waveform Ta, the first restoration waveform Tb, and the second restoration waveform Tc is not required to be equivalent to other cycles, but may be different from each other. Each frequency and duty ratio of the normal mode waveform Ta, the first restoration waveform Tb, and the second restoration waveform Tc may be varied in the middle of operation under the corresponding waveform.

There is a possibility that flicker is detected on both the electrodes 15 and 16 at the same time in the light source 100. In this case, the light source driving system 70 can restore the first electrode 15 initially and the second electrode 16 later in the restoration mode, for example.

According to the light source 100, the electrodes 15 and 16 may be sequentially melted while the discharge lamp is turned off, and the tips 15a and 16a may be formed at the next period of lighting.

The flicker sensor 70f of the light source 100 is not limited to the type which detects illuminance variations by using photo-diode or the like, but may be such a type which monitors ripples of current flowing between the first and second electrodes 15 and 16, of voltage applied between the first and second electrodes 15 and 16, or other conditions.

The lamp included in the light source unit 10 of the light source 100 may be a high-pressure mercury lamp, metal halide lamp, or other various types of lamp.

According to the projector 200 in this embodiment, a pair of fly-eye lenses 23a and 23b are employed for dividing light from the light source 100 into a plurality of partial lights. However, the invention is applicable to a projector having no fly-eye lens, that is, no lens array. It is also possible to use a rod integrator in place of the fly-eye lenses 23a and 23b.

While the projector 200 includes the polarization conversion element 24 for converting light from the light source 100 into polarized light having particular direction, the invention is applicable to a projector which does not include the polarization conversion element 24.

While the transmission type projector has been described in this embodiment as an example of the invention, the invention is applicable to a reflection type projector. The "transmission type" herein refers to a type where a liquid crystal light valve including a liquid crystal panel and the like transmits light, and the "reflection type" refers to a type where a liquid crystal light valve reflects light. The light modulation unit is not limited to a liquid crystal panel or the like, but may be a light modulation unit which uses a micromirror or the like.

There are a front type projector which projects an image from the projection surface viewing side, and a rear type projector which projects an image from the side opposite to the projection surface viewing side. The structure of the projector shown in FIG. 1 is applicable to both of these types.

While only the example of the projector 200 which uses the three liquid crystal panels 41a through 41c has been discussed in this embodiment, the invention is applicable to a projector including only one liquid crystal panel, a projector including two liquid crystal panels, and a projector including four or more liquid crystal panels.

While respective color lights are modulated by using components such as the color separation system 30 and the liquid crystal light valves 40a, 40b and 40c in this embodiment, color lights may be modulated and combined by using a combination of a color wheel illuminated by the light source 100 and the illumination system 20 and a device constituted by pixels of micromirrors and receiving light having passed through the color wheel instead of using the color separation system 30 and the liquid crystal light valves 40a, 40b and 40c.

What is claimed is:

1. A projector, comprising:
   an discharge lamp which has a first electrode and a second electrode and emits light by generating discharge between the first and second electrodes; and
   a driving system which supplies power by alternating polarities applied to the first electrode and the second,
   the driving system being operable in a restoration mode, and
   the driving system melting surface layers of a tip and a surrounding area of the tip extending from a main body of one of the first and second electrodes, and expands a new tip on a tip area of the main body of the one electrode in the restoration mode.

2. The projector according to claim 1,
   the driving system expanding a tip on a tip area of a main body of the other electrode when melting the surface layers of the tip and the surrounding area of the tip of the one electrode in the restoration mode.

3. The projector according to claim 1,
   the driving system regularly operating in the restoration mode at predetermined time intervals.

4. The projector according to claim 1,
   the driving system suspending operation in the restoration mode until the operation of the discharge lamp enters the normal mode after startup.

5. The projector according to claim 1, further comprising:
   a detection unit which detects electrode abnormal condition where at least either the operation of the first electrode or the second electrode is abnormal,
   the driving system starting operation in the restoration mode according to detection result of the detection unit.

6. The projector according to claim 1,
   the driving system employing alternating current waveform having a peak at least in the longer period of the two polarity periods in one cycle lies immediately before polarity switch.

7. The projector according to claim 1,
   in case that the driving system suspends either the melting step or the expansion step for the tip, the driving system carrying out the remaining part of either the melting step or the expansion step performed before suspension after the operation of the discharge lamp enters the normal mode.

8. The projector according to claim 1, further comprising:
   a light modulation unit which receives illumination light emitted from the discharge lamp; and
   a projection system which projects image light having passed through the light modulation unit.

9. The projector according to claim 1,
   the driving system melting the surface layers of the tip and the surrounding area of the tip extending from the main body of the one electrode by increasing the anode period of the one electrode longer than the anode period of the other electrode, and expanding the tip on the tip area of the main body of the one electrode by decreasing the anode period of the one electrode shorter than the anode period of the other electrode in the restoration mode.

10. The projector according to claim 9,
    the driving system changing duty ratio of alternating current waveform for the first and second electrodes from duty ratio of alternating current waveform in a normal mode when melting the surface layers of the tip and the surrounding area of the tip of the one electrode in the restoration mode, satisfying a conditional expression of $0.5<a<1$ assuming that the anode period proportion of the one electrode is a and that the anode period proportion of the other electrode is 1−a.

11. The projector according to claim 10,
    a conditional expression $0<b<0.5$ being satisfied when the tip of the main body of the one electrode is expanded assuming that the anode period proportion of the one electrode is b and that the anode period proportion of the other electrode is 1−b in the restoration mode.

12. The projector according to claim 11,
    duty ratio of alternating current waveform for the one electrode and the other electrode being substantially constant in the normal mode; and
    a conditional expression $b<c<a$ being satisfied assuming that the anode period proportion of the one electrode is c and that the anode period proportion of the other electrode is 1−c in the normal mode.

13. A driving method of a light source for a projector which contains an discharge lamp having a first electrode and a second electrode, emits light by generating discharge between the first and second electrodes, and changes duty ratio of alternating current waveform in a restoration mode, comprising;
    melting surface layers of a tip and a surrounding area of the tip of one electrode by increasing the anode period of at least one of the first and second electrodes longer than the anode period of the other electrode; and
    expanding a tip on a tip area of a main body of the one electrode by decreasing the anode period of the one electrode shorter than the anode period of the other electrode.

14. An apparatus comprising:
    (i) a discharge lamp having a first electrode and a second electrode, the first electrode including a first tip, a first tip area, and a first surrounding area, and the second electrode including a second tip, a second tip area and a second surrounding area;
    (ii) a detection unit;
    (iii) a driving unit; and
    (iv) a control unit;
    the driving unit supplying power by alternating polarities applied to the first electrode and the second electrode;
    the light unit emitting light by generating a discharge between the first electrode and the second electrode the detection unit detecting whether the light unit is operating under a predetermined normal condition, or whether the light unit is operating under abnormal conditions;

the control unit controlling the operation of the driving unit based on results of the detection unit by controlling an alternating current waveform the driving unit supplies to the light unit;

upon detection that the light unit is operating under abnormal conditions, the control unit controls the driving unit such that the driving unit operates in a restoration mode, wherein the alternating current waveform supplied to the light unit operates such that at least one of the following is performed:
- (a) melting a surface layer of the first tip and first surrounding area, and expanding a tip on the second tip area; and
- (b) melting a surface layer of the second tip and second surrounding area, and expanding a tip on the first tip area.

15. The apparatus according to claim 14, the driving unit regularly operating in the restoration mode at predetermined time intervals.

16. The apparatus according to claim 14, the driving unit:
- (a) melting the surface layers of at least one of (i) the first tip and the first surrounding area, and (ii) the second tip and the second surrounding area, by increasing a period of time under which one of the first electrode and second electrode operates as an anode, such that the period of time the one of the first electrode and the second electrode operates as an anode is longer than a period during which the other of the one of the first electrode and the second electrode operates as an anode; and
- (b) expanding at least one of (i) the tip on the first tip area, and (ii) the tip on the second tip area, by decreasing the period of time under which one of the first electrode and the second electrode operates as an anode, such that the period of time the anode period of time the one of the first electrode and the second electrode operates as an anode is shorter than a time period of time during which the other of the one of the first electrode and the second electrode operates as an anode.

17. The apparatus according to claim 16, the driving unit changing a duty ratio of the alternating current waveform for the first and second electrodes from a duty ratio under which the driving unit operates in normal mode, to a duty ration under which the driving unit operates in restoration mode, such that satisfying a conditional expression of $0.5<a<1$ assuming that the anode period proportion of the one of the first electrode and the second electrode one electrode is a and that the anode period proportion of the other of the one of the first electrode and the second electrode is $1-a$.

* * * * *